(12) United States Patent
Jekimow et al.

(10) Patent No.: US 9,618,247 B2
(45) Date of Patent: Apr. 11, 2017

(54) METHOD FOR INCREASING THE VALVE CAPACITY OF A REFRIGERATION UNIT

(71) Applicant: SIEMENS AKTIENGESELLSCHAFT, Munich (DE)

(72) Inventors: Alexander Jekimow, Cham (CH); Karl-Heinz Petry, Pfaeffikon (CH); Giuseppe Tramaglino, Schuebelbach (CH)

(73) Assignee: SIEMENS SCHWEIZ AG, Zurich (CH)

( * ) Notice: Subject to any disclaimer, the term of this patent is extended or adjusted under 35 U.S.C. 154(b) by 429 days.

(21) Appl. No.: 13/668,946

(22) Filed: Nov. 5, 2012

(65) Prior Publication Data
US 2013/0111929 A1    May 9, 2013

(51) Int. Cl.
*F25B 41/04*    (2006.01)
*F25B 41/06*    (2006.01)

(52) U.S. Cl.
CPC .... *F25B 41/062* (2013.01); *F25B 2341/0661* (2013.01); *F25B 2600/2513* (2013.01); *F25B 2600/2519* (2013.01)

(58) Field of Classification Search
CPC ............ F25B 41/062; F25B 2600/2519; F25B 2600/2513; F25B 2341/0661
USPC ............ 62/212, 222, 56, 197, 210, 224, 511
See application file for complete search history.

(56) References Cited

U.S. PATENT DOCUMENTS

| 3,559,422 | A | * | 2/1971 | Holzer | F25B 41/04 |
| | | | | | 62/209 |
| 4,112,703 | A | * | 9/1978 | Kountz | 62/211 |
| 4,332,144 | A | * | 6/1982 | Shaw | 62/324.1 |
| 4,685,309 | A | * | 8/1987 | Behr | F25B 5/00 |
| | | | | | 251/129.05 |

(Continued)

FOREIGN PATENT DOCUMENTS

| CN | 200943982 Y | 9/2007 |
| CN | 200972290 Y | 11/2007 |

(Continued)

OTHER PUBLICATIONS

Office Action mailed Jul. 8, 2014 for corresponding Chinese Patent Application No. 201210432514.5.

(Continued)

*Primary Examiner* — Allana Lewin Bidder
*Assistant Examiner* — Kun Kai Ma
(74) *Attorney, Agent, or Firm* — Slayden Grubert Beard PLLC (57) ABSTRACT

A system supplies a fluid to an evaporator of a refrigeration unit and has first and second lines connected to a fluid inlet of the evaporator. The system has an expansion valve with a continuously modifiable first flow cross section, disposed in the first line, the continuously modifiable first flow cross section setting a first mass flow through the first line. A shut-off device is disposed in the second line and switchable discretely between an open position and a closed position. A throttle with a constant second flow cross section is disposed in the second line. A control unit continuously modifies the first flow cross section of the expansion valve and controls the shut-off device as a function of the first flow cross section.

23 Claims, 4 Drawing Sheets

(56) References Cited

U.S. PATENT DOCUMENTS

| | | | | |
|---|---|---|---|---|
| 5,003,786 | A | * | 4/1991 | Fudono ................ F25D 21/002 62/126 |
| 5,014,574 | A | * | 5/1991 | Sasajima ............... F16H 61/423 477/68 |
| 5,177,972 | A | | 1/1993 | Sillato et al. |
| 6,324,856 | B1 | | 12/2001 | Weng |
| 7,992,395 | B2 | * | 8/2011 | Zhang et al. ................... 62/115 |
| 7,997,092 | B2 | * | 8/2011 | Lifson et al. ................... 62/115 |
| 8,136,364 | B2 | * | 3/2012 | Lifson ..................... F25B 41/06 62/197 |
| 2004/0020223 | A1 | * | 2/2004 | Doi et al. ......................... 62/225 |
| 2008/0203341 | A1 | | 8/2008 | Feigel et al. |
| 2009/0095364 | A1 | * | 4/2009 | Itoh ................... C23C 16/45523 137/861 |
| 2009/0320506 | A1 | * | 12/2009 | Lifson ..................... F25B 41/06 62/113 |
| 2010/0121495 | A1 | * | 5/2010 | Okoren ................. F25B 25/005 700/282 |

FOREIGN PATENT DOCUMENTS

| | | | |
|---|---|---|---|
| CN | 201184714 Y | | 1/2009 |
| CN | 101680688 A | | 3/2010 |
| DE | 1935834 | | 1/1971 |
| EP | 0148108 | | 7/1985 |
| EP | 11187670 | | 11/2011 |
| JP | 2009-501888 A | | 1/2009 |
| JP | 2010210144 A | * | 9/2010 |
| KR | 10-2004-0036029 | | 4/2004 |
| KR | 10-0504564 | | 7/2005 |
| KR | 10-1178634 | | 8/2012 |
| WO | 2008/036079 | | 3/2008 |

OTHER PUBLICATIONS

Office Action mailed Jul. 29, 2014 for corresponding Korean Patent Application No. 10-2012-0123236.

* cited by examiner

METHOD FOR INCREASING THE VALVE CAPACITY OF A REFRIGERATION UNIT

CROSS REFERENCE TO RELATED APPLICATIONS

This application claims the benefit of EP11187670, filed on Nov. 3, 2011 in the European Patent Office, the disclosure of which is incorporated herein in its entirety by reference.

BACKGROUND

The present invention relates to a system for supplying a fluid to an evaporator of a refrigeration unit and a method for supplying a fluid to an evaporator of a refrigeration unit.

Correspondingly large expansion valves are used in refrigeration systems with a large refrigeration capacity. An expansion valve is used to expand a liquid refrigerant and direct it to a so-called evaporator. Large expansion valves allow a large mass flow of refrigerant to be controlled, in order to achieve an output range of more than 1 MW with the refrigeration unit. Such large expansion valves are technically complex and expensive to produce.

In order to be able to use smaller expansion valves without reducing the refrigeration capacity of the refrigeration system, a number of expansion valves are connected in a parallel manner upstream of the evaporator. The expansion valves connected in a parallel manner either operate synchronously or are controlled individually independently of one another. Individual control is complex. Also as the control complexity increases, so does the probability of failure. Also the use of a number of expansion valves is very expensive.

SUMMARY

One potential object is to provide robust and economical regulation for a refrigeration unit.

The inventors propose a system for supplying a fluid to an evaporator of a refrigeration unit and by a method for supplying a fluid to an evaporator of a refrigeration unit.

According to a first aspect a system for supplying a fluid to an evaporator of a refrigeration unit is described. The system has a first line, which can be connected to a fluid inlet of the evaporator, and a second line, which can be connected to the fluid inlet of the evaporator. The system also has an expansion valve with a continuously modifiable flow cross section. The expansion valve is disposed in the first line in such a manner that the continuously modifiable first flow cross section can be used to set a first mass flow of the fluid through the first line continuously.

The system also has a shut-off device, which is disposed in the second line. The shut-off device can be switched discretely between an open position and a closed position, it being possible to convey a second mass flow of the fluid through the second line when the shut-off device is in the open position and a fluid flow through the second line being prevented when the shut-off device is in the closed position.

The system also has a throttle with a constant second flow cross section. The throttle is disposed in the second line in such a manner that the second mass flow can be conveyed through the second flow cross section when the shut-off device is in the open position.

The system also has a control unit, which is set up so that a continuous modification of the first flow cross section of the expansion valve can be controlled and the shut-off device can be controlled as a function of the first flow cross section or the required overall flow cross section (of the first and second line).

According to a further aspect a method for conveying a fluid to an evaporator of a refrigeration unit is described. According to the method a first mass flow of the fluid in a first line is controlled. The first line is connected to a fluid inlet of the evaporator. The first mass flow is controlled by continuously modifying a first flow cross section of an expansion valve, which is disposed in the first line.

According to the method a shut-off device, which is disposed in a second line coupled to the fluid inlet, is also controlled so that when the shut-off device is in the open position, a second mass flow of the fluid flows through the second line and when it is in a closed position, a fluid flow through the second line is prevented. A throttle is disposed with a constant second flow cross section in the second line so that the second mass flow flows through the second flow cross section when the shut-off device is in the open position.

The shut-off device is controlled as a function of the first flow cross section of the expansion valve or the required overall flow cross section (of the first and second line).

An evaporator of a refrigeration unit is used in particular in compression refrigeration units. Such a compression refrigeration unit is a refrigeration unit, which utilizes the physical effect of the evaporation heat of the fluid (refrigerant) as the aggregate state changes from liquid to gaseous. A refrigerant that moves in a closed circuit experiences different aggregate state changes one after the other, in particular between the liquid and gaseous aggregate states.

A compression refrigeration unit has at least one throttle, a condenser, a throttle region and the evaporator. A gaseous refrigerant (fluid) is first taken in and compressed by a compressor in a compression refrigeration unit. The fluid condenses in the downstream condenser, dissipating heat as it does so and heating its surroundings for example. The liquid refrigerant then expands due to the pressure change in the adjacent throttle region. The refrigerant evaporates in the downstream evaporator while absorbing heat at low temperature (so-called evaporation cooling). The absorption of heat by the refrigerant in the evaporator brings about a cooling effect in the surroundings of the evaporator. The evaporated and gaseous refrigerant is then fed back to the compressor for example.

The evaporator can be for example a so-called flooded evaporator or an evaporator with refrigerant injection or dry expansion. In an evaporator with dry expansion the fluid is prepared in the throttle region upstream of the fluid inlet so that the state parameters (e.g. temperature, pressure, mass flow) of the fluid are set in such a manner that the refrigerant evaporates completely at the fluid outlet of the evaporator and is present in a superheated state. The refrigerant can be present at the fluid inlet in a liquid, partially evaporated (gaseous with droplets) or evaporated (gaseous) state. The system and method respectively are suitable in particular for dry expansion, since dry expansion places high demands on superheating regulation. Superheating regulation in the case of dry expansion is more complex and demanding, requiring fast/transitionless switching.

The state parameters of the fluid and refrigerant respectively also have to be set before introduction into the evaporator so that sufficient refrigeration capacity (heat absorption by the refrigerant) is generated in the evaporator and the refrigerant is present where possible in a gaseous or superheated gaseous state at the fluid outlet of the evaporator. If the refrigerant is not present at the fluid outlet of the evaporator in a gaseous, in particular superheated gaseous state, the droplets present in the steam may damage a downstream compressor. It is also favorable in respect of energy, if the refrigerant is evaporated in the evaporator to a gaseous or superheated gaseous state. It is therefore necessary to use the throttle facility to set the state parameters of the refrigerant at the fluid outlet of the evaporator. The state parameters of the refrigerant are for example the temperature, pressure, aggregate state and mass flow of the fluid.

According to the present invention the state parameters of the fluid (refrigerant) at the fluid outlet and/or at the fluid inlet of the evaporator are set by the expansion valve in the first line and by the second line connected in a parallel manner with the shut-off device and throttle (in particular by expansion).

The expansion valve has a continuously modifiable opening cross section and can thus be referred to as a so-called "continuous valve". A continuous valve can be activated in particular electrically and can allow a continuous transition between individual switching positions and therefore individual first flow cross sections in the expansion valve, in order thus to modify the first flow cross section continuously. The continuous modification of the first flow cross section allows a first mass flow or volume flow of the fluid flowing through the first line to be set precisely and continuously. The expansion valve is for example a proportional valve, in which a proportional magnet allows a continuous transition of the valve opening, or a control valve with a linear volume flow characteristic and zero overlap of the valve control edges. The expansion valve can likewise be configured as a servo valve, which can be activated for example in an analogous manner and thus has for example a linear or an equal-percentage continuous opening characteristic.

The expansion valve can be for example a solenoid valve with a path detection facility for the valve piston or movable valve element, so that the path detection facility can determine the first flow cross section based on knowledge of the valve position.

According to a further exemplary embodiment the expansion valve is an electromechanically configured valve. The electromechanically continuously adjustable expansion valve can be for example a solenoid valve, a piezo valve, an induction-controlled and/or motorized valve.

The term "shut-off device" refers in the following to a valve that can be switched discretely and discontinuously (e.g. a gate valve), allowing a fluid flow in the second pipe in the open position or blocking it, without intermediate open positions being possible. Discretely means for example that the shut-off device does not have intermediate positions that can be set between its open position and its closed position. In contrast to the continuously adjustable first flow cross section of the expansion valve, the shut-off device has a maximum flow cross section in the open position so that the second mass flow of the fluid flows through. When the shut-off device is in the closed position, there is no flow cross section, so no fluid flows through the second line.

The shut-off device can be configured for example as a discretely switchable solenoid valve. A solenoid valve is actuated by an electromagnet, which can be controlled for example by the control unit. Solenoid valves have very fast switching times compared with mechanically controlled valves.

Disposed downstream or even upstream of the shut-off device is the throttle with a constant second cross section, through which the fluid flows with the second mass flow when the shut-off device is in the open position. The shut-off device can also integrally comprise a constant throttle and be configured as a solenoid valve. Both functions, namely the throttle function and the shut-off function, are thus combined. A further throttle is for example not additionally required. These two functions can be achieved correspondingly by a single component.

The shut-off device can also be configured as a solenoid valve with integrated constant throttle. Output is regulated here for example by pulse width modulation. Such a valve is opened discretely 0% or 100% and the mass flow can be regulated discretely by varying the closing and opening times respectively. Such a valve can therefore also take on the task of shut-off device and throttle, in that it is simply activated or deactivated rather than being operated with pulse width modulation.

The expansion valve and throttle with their respective first and second flow cross sections respectively form a local constriction in the first line or second line respectively. This reduces the pressure of the first mass flow and second mass flow of the fluid flowing through and brings about fluid expansion, with no or little heat being dissipated.

The fluid is supplied in a gaseous or saturated steam-type state at the fluid inlet of the evaporator by way of the throttle and by way of the expansion valve.

The control unit according to the present invention controls the continuous modification of the first flow cross section of the expansion valve. The control unit also controls the shut-off device (open position⇌closed position) as a function of the first flow cross section of the expansion valve and/or as a function of the required overall flow cross section.

The continuously controllable expansion valve is characterized by a fast control speed, a high level of positioning accuracy and precise position feedback (e.g. due to an integrated path detection facility).

The expansion valve has a structurally necessary valve characteristic. The valve characteristic contains information about the degree of opening of the valve (e.g. valve lift) or the flow cross section with which a respective Kv value (fluid throughput) is possible.

The Kv value is also referred to as the throughflow factor or throughflow coefficient. It is a measure of the achievable throughput of fluid through a valve and is used to select and dimension valves. The Kv value is given for example in the unit $m^3/h$ (cubic meters/hour).

The Kv value of the throttle is also known. The control unit determines the requirement for an overall mass flow of the fluid at the fluid inlet of the evaporator. To achieve even more precise setting of the overall mass flow, the control unit is connected to a sensor facility, in order additionally to acquire further state parameters of the fluid at the fluid inlet and/or at the fluid outlet, which are included in the calculation or determination of the Kv value in order to set the degrees of opening of the valve or the first flow cross section of the expansion valve and the switching point of the shut-off device more precisely. The control unit controls the discretely switchable shut-off device and the continuously modifiable expansion valve as a function of the requirement for the overall mass flow at the fluid inlet. Since the control unit knows the current first flow cross section and the second flow cross section including the associated Kv values, the control unit can use these to set the desired first mass flow and the desired second mass flow. The control unit can set a desired first mass flow and a desired second mass flow as a function of the first flow cross section and the second flow cross section and with knowledge of the Kv value of the expansion valve and throttle, in order to achieve the desired overall mass flow at the fluid inlet of the evaporator.

With the present invention it is possible to set a high overall mass flow of the fluid (refrigerant) at the fluid inlet of the evaporator in an extremely efficient and precise manner, without having to use large and expensive continuously adjustable expansion valves. According to the present invention the first line is connected parallel to the second line and coupled at a node point to a fluid inlet of the evaporator.

If the evaporator is required to have low cooling capacity, the shut-off device is in the closed position and the fluid flows solely through the first line and thus through the expansion valve. If cooling capacity requirement increases, the control unit controls the expansion valve in such a manner that the first flow cross section increases continuously (i.e. linearly or with small intermediate steps), so that the first mass flow flowing through the first flow cross section also increases.

When a first predefined cross section size (for example maximum size) of the first flow cross section is reached, the control unit controls the shut-off device in such a manner that it is moved to the open position, so that the second mass flow of the fluid flows to the fluid inlet. At the same time, or with a delay of for example approx. 0.01 to approx. 1.5 seconds before or after, the control unit reduces the first flow cross section of the expansion valve in such a manner that the first mass flow is reduced by the second mass flow, so that the overall mass flow at the fluid inlet remains constant before the shut-off device is moved to the open position and after the shut-off device is moved to the open position. When the shut-off device is in the closed position, the overall mass flow is defined solely by the first mass flow. When the shut-off device is in the open position, the overall mass flow at the fluid inlet is formed by the sum of the first mass flow and the second mass flow.

When the shut-off device has opened, the fluid flows with a second mass flow through the second line and thus through the throttle, which has a constant second flow cross section. If the shut-off device is already in the open position and further valve capacity (e.g. a higher throughflow/flow cross section) is required, the control unit controls the expansion valve in such a manner that the first flow cross section is continuously opened again, so that the first mass flow increases until the required refrigeration capacity is achieved in the evaporator.

If the required refrigeration capacity drops, the control unit reduces the first flow cross section and thus the first mass flow continuously. When the first flow cross section of the expansion valve reaches a predefinable second (minimum) cross section size, the control unit controls the shut-off device to the closed position and at the same time, or with a delay of for example approx. 0.01 to approx. 1.5 seconds before or after, increases the first flow cross section in such a manner that the overall mass flow at the fluid inlet of the evaporator remains constant as the shut-off device is switched. If the required refrigeration capacity in the evaporator is further reduced, the control unit again reduces the first flow cross section continuously.

The use of valves that can be switched quickly (shut-off device, expansion valve), an optimized switching algorithm of the control unit and the inertia of the controlled fluid system mean that the overall mass flow at the fluid inlet of the evaporator remains virtually constant during a switching process for the shut-off device and for the expansion valve.

With the present invention it is possible to use smaller and more reliable expansion valves instead of a larger number or larger size of continuously modifiable expansion valves, without restricting the overall cooling capacity of a refrigeration unit. The required higher cooling capacity of the refrigeration unit is achieved by the discrete activation of a second mass flow and a simultaneous reduction of the first flow cross section of the expansion valve. The technical units for discrete activation, for example the shut-off device and the throttle with a constant second flow cross section, have a high level of reliability and lower procurement costs than expansion valves with a continuously adjustable flow cross section. It is thus possible to create a more efficient, robust and reliable system for supplying a fluid to an evaporator of a refrigeration unit.

According to a further exemplary embodiment the expansion valve is set up to measure the set first flow cross section and to transfer the information about the measured first flow cross section to the control unit.

According to a further exemplary embodiment the system also has a sensor facility. The sensor facility can be coupled to the fluid inlet and/or a fluid outlet of the evaporator in such a manner that at least one state parameter (temperature, pressure, aggregate state and and/or mass flow of the fluid) can be measured at the fluid inlet and/or at the fluid outlet. The sensor facility is set up to transfer the measured state parameter of the fluid to the control unit. The control unit is configured in such a manner that the expansion valve and/or shut-off device can be controlled as a function of the state parameter. In other words the control unit can control the first mass flow and/or the second mass flow as a function of the measured state parameters of the fluid, to set a desired refrigeration capacity and a desired aggregate state of the refrigerant in particular at the fluid outlet of the evaporator.

The proposals allow the overall cooling capacity and the associated refrigerant (fluid) requirement to be supplied, without requiring a larger expansion valve or using a number of expansion valves that are complex to control.

According to a further exemplary embodiment the expansion valve has a first Kv value and the throttle has a second Kv value. The first Kv value is greater than the second Kv value.

According to a further exemplary embodiment, when there is a greater cooling capacity requirement, a number of further second lines can be disposed parallel to the first line. Depending on the requirement for overall mass flow of the fluid at the fluid inlet of the evaporator, a number of further second mass flows can be activated as required by way of a number of further shut-off devices.

In other words the system according to a further exemplary embodiment can have a further second line, which can be connected to the fluid inlet of the evaporator, a further shut-off device, which is coupled to the further second line, and a further throttle with a further constant flow cross section.

The further shut-off device can be controlled in such a manner that when the further shut-off device is in a further open position, a further second mass flow of the fluid flows through the further second line and when it is in a further closed position, no fluid flows through the further second line. The further throttle is coupled to the further second line in such a manner that when the further shut-off device is in the further open position, the further second mass flow can be conveyed through the further second flow cross section of the further second throttle.

The control unit is set up in such a manner that the further shut-off device can be controlled as a function of the first flow cross section and the second flow cross section.

If for example the first flow cross section reaches its maximum value and the shut-off device is already in the open position but a greater quantity of refrigerant is still required in the evaporator, the control unit controls the further shut-off device in such a manner that it is moved to the open position. At the same time (or with a certain delay before or after) the first flow cross section of the expansion valve is reduced (for example by the amount of the further flow cross section of the further shut-off device), to keep the overall mass flow at the fluid inlet constant during the switching process for the further shut-off device.

According to a further aspect of the method the shut-off device is controlled to the open position, when the first flow cross section of the expansion valve exceeds a first predefined cross section size (e.g. the maximum cross section size). The shut-off device is also controlled to the closed position, when the first flow cross section of the expansion valve drops below a second predefined cross section size (e.g. the minimum cross section size).

The first cross section size and the second cross section size represent design-based or efficiency-based predefined variables, at which the control unit performs the respective switching processes for the gate valves.

According to a further exemplary embodiment of the method the first cross section size is greater than 70% of a maximum cross section size of the first flow cross section of the expansion valve. Additionally or alternatively the second cross section size can be selected to be smaller than 30% of the maximum cross section size.

The system and method described above allow the valve capacity of a refrigeration unit to be increased as required. Depending on the valve capacity requirement a number of second lines (including associated throughflow cross sections and second flow cross sections of corresponding shut-off devices and throttles respectively) can be added parallel to the first line.

The proposals allow an economical solution to be achieved for supplying a fluid to an evaporator. The valve capacity or overall mass flow at the fluid inlet of the evaporator can be expanded as required. Also smaller, more economical and more robust (electric) expansion valves can be used, thereby also reducing the risk of failure due to the simple technical structure. The fast switching speed of the expansion valve and shut-off device and the inertia of the controlled fluid system mean that a high level of control accuracy is possible even during the switching processes between activation and deactivation of the shut-off device. Valves with large dimensions also have poor resolution in the partial load range (at low capacity). Activating a number of second lines extends the resolution of the "small" expansion valve in the first line to a large capacity range by the second lines that can be activated in a parallel manner, thereby increasing overall accuracy.

It should be noted that the embodiments described here only represent a limited selection of possible variants. It is therefore possible to combine the features of individual embodiments with one another in an appropriate manner, so that a plurality of different embodiments can be considered to be clearly disclosed to the person skilled in the art with the variants set out here.

It should be noted that embodiments are described with reference to different subject matters. In particular, some embodiments are described based on the apparatus and other embodiments are described based on the method. However it is immediately clear to the person skilled in the art when reading the present application that, unless otherwise specifically stated, not only is a combination of features belonging to one type of subject matter possible but so too is any combination of features, which belong to different types of subject matter.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
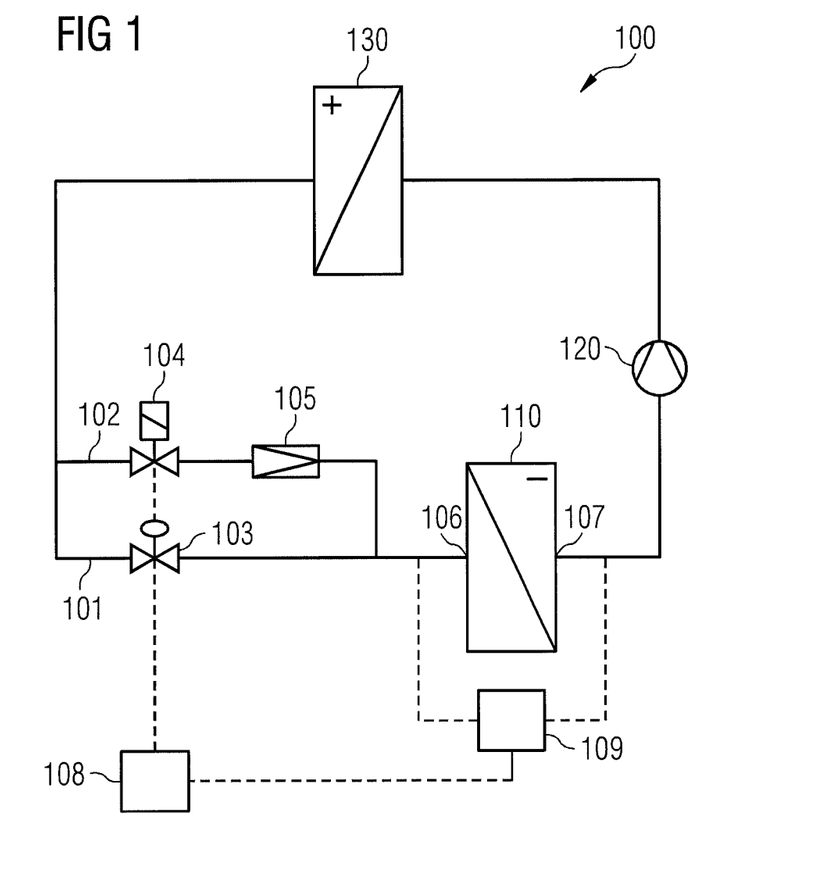
FIG. 1 shows a schematic diagram of an embodiment.

FIG. 1 shows a refrigeration unit 100, which has an evaporator 110, a compressor 120 and a condenser 130. Disposed upstream of the evaporator 110 is a throttle facility, including a first line 101 and at least one second line 102, which is connected parallel to the first line 101.

The continuous lines in FIG. 1 show fluid lines of the refrigeration unit 100. The broken lines show control lines or data lines.

The first line and the second line 102, which is connected parallel to the first line 101, are connected to the fluid inlet 106 of the evaporator 110. An expansion valve 103, which has a continuously adjustable first flow cross section, is disposed in the first line 101 in such a manner that the continuously variable first flow cross section can be used to set a first mass flow of the fluid in the first 101 continuously. Disposed in the second line 102 are a shut-off device 104 and a throttle 105 with a constant second flow cross section. The shut-off device 104 can be controlled in such a manner that when the shut-off device 104 is in the open position, a second mass flow of the fluid flows through the second line 102 and when the shut-off device 104 is in the closed position, no fluid flows through the second line 102 or a fluid flow through the second line 102 is prevented.

The throttle 105 is disposed in the second line 102 in such a manner that when the shut-off device 104 is in the open position, the second mass flow can be conveyed through the second flow cross section. A control unit 108 controls a continuous modification of the first flow cross section of the expansion valve 103 and controls the open position and closed position respectively of the shut-off device 104 as a function of the first flow cross section.

The fluid is made available with predefined state parameters at the fluid inlet 106 in the evaporator 110. The predefined state parameters at the fluid inlet are selected so that after flowing through the evaporator 110 the refrigerant evaporates completely at the fluid outlet 107 and is present in a superheated state. A sensor facility 109 can measure the state parameters, such as fluid temperature, pressure, aggregate state and the mass flow of the fluid, at the fluid inlet 106 and in particular at the fluid outlet 107 and can supply the measured state parameters to the control unit 108.

In other words the controlled variable is the superheating of the fluid at the fluid outlet 107. Superheating at the evaporator 110 can be determined in different ways. Generally the pressure and temperature are measured at the fluid outlet 107. The pressure is then converted to temperature. The difference between the two temperatures forms the superheating value. Alternatively, instead of the pressure at the fluid outlet 107, a second temperature can be measured at the fluid inlet 106, multiplied by correction factors and used to calculate superheating. It is also possible to measure the saturated steam content directly at the fluid outlet 107.

To summarize, the controlled variable describes the state or states at the fluid outlet 107. The sensors of the sensor facility 109 can in particular be disposed at the fluid outlet 107 and/or at the fluid inlet 106.

The control unit 108 can increase or reduce the first opening cross section of the expansion valve 103 continuously as required as a function of the measured sensor data or the measured state parameters of the fluid at the fluid inlet 106 and at the fluid outlet 107, so that a first mass flow of the fluid in the first line 101 and thus an overall mass flow at the fluid inlet 106 can be set correspondingly.

If the overall mass flow requirement exceeds the first mass flow that is present with a first cross section size (maximum cross section size) of the first flow cross section, the control unit 108 switches the shut-off device 104 to the open position, so that the second mass flow flows through the throttle 105 and the second line 102 to the fluid inlet 106. At the same time, or with a delay of for example approx. 0.01 to approx. 1.5 seconds before or after, the control unit 108 controls the expansion valve 103 in such a manner that the first flow cross section and therefore also the first mass flow are reduced, so that the overall mass flow at the fluid inlet 106 remains constant during the switching process for the shut-off device 104.

If the control unit 108 or the sensor facility 109 determines that a higher overall mass flow is required at the fluid inlet 106, the control unit 108 controls the first flow cross section of the expansion valve continuously until the first cross section size of the first flow cross section is reached again.

When the first cross section size of the flow cross section of the expansion valve 103 is reached again, the maximum valve capacity of the refrigeration unit for example is reached or a further shut-off device 104, which is coupled to a further second line running parallel to the first line 101, is switched to the open position, so that a further second mass flow flows through the further second line. At the same time, or with a delay of for example approx. 0.01 to approx. 1.5 seconds before or after, the first flow cross section is reduced again so that the overall mass flow at the fluid inlet 106 does not change and remains constant during the switching process for the further shut-off device.

In FIG. 1 the possible further gate valves, the further second lines and further throttle are not shown, for greater clarity.

If the refrigeration capacity requirement is reduced, the overall mass flow at the fluid inlet 106 for example must also be reduced. If the requirement for the overall mass flow at the fluid inlet 106 drops below a second cross section size (e.g. minimum cross section size of the first flow cross section or closed position of the expansion valve 103) of the first flow cross section of the expansion valve 103, the control unit 108 controls the shut-off device 104 to the closed position and at the same time, or with a certain delay before or after, increases the first flow cross section in such a manner that the overall mass flow at the fluid inlet 106 remains constant during the switching process. If the requirement for the overall mass flow of the fluid at the fluid inlet 106 drops further, the first flow cross section of the expansion valve 103 is reduced continuously, until the refrigeration unit 100 is deactivated or a further shut-off device 104 in a further second line connected in a parallel manner to the first line 101 is controlled to the closed position.

Figure 2:
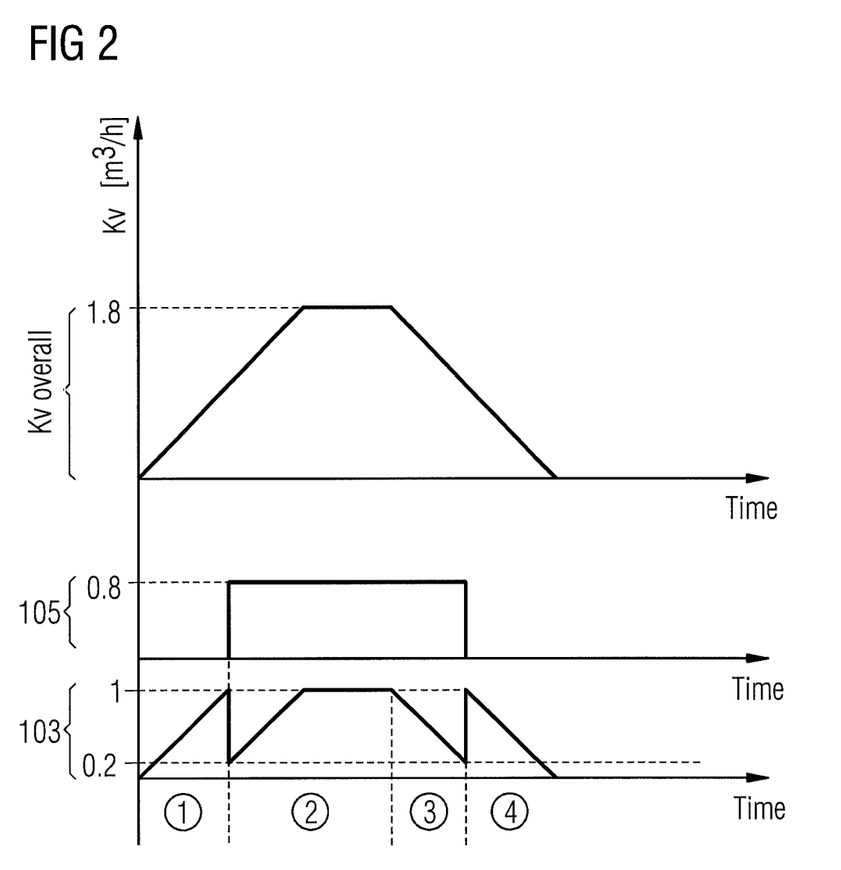
FIG. 2 shows a diagram illustrating a method for controlling a system with a second line connected in a parallel manner according to an exemplary embodiment.

FIG. 2 shows a diagram illustrating a method for controlling a system with a second line 102 connected in a parallel manner according to an exemplary embodiment, as shown for example in FIG. 1.

In the diagram in FIG. 2 the course of time is shown along the X-axis (abscissa) and the Kv value or throughflow factor in cubic meters per hour ($m^3/h$) is shown along the Y-axis (ordinate). The diagram in FIG. 2 shows the Kv value patterns of the expansion valve 103 and throttle 105 and the overall throughflow quantity at the fluid inlet 106 of the evaporator 110, which corresponds to the sum of the throughflow quantities or Kv values of the first line 101 (expansion valve 103) and the second line 102 (throttle 105).

The expansion valve 103 shown in FIG. 2 is designed with a maximum Kv value of 1 $m^3/h$ and the throttle 105 is designed by way of example with a maximum Kv value of 0.8 $m^3/h$. The maximum Kv values of the individual throttles 105 and/or expansion valves 103 can also have other values in other examples. In one advantageous embodiment however the maximum Kv value of the expansion valve 103 is greater than the maximum Kv value of the throttle 105.

Four operating states are also shown along the time axis in FIG. 2. In operating state 1 the throughflow quantity ($m^3/h$) rises until the maximum Kv value of the expansion valve 103 (in FIG. 2 KV=1 $m^3/h$) is reached. If a greater throughflow quantity of the fluid or refrigerant is required, the shut-off device 104 is switched to the open position, so that a corresponding throughflow quantity of fluid is supplied to the downstream evaporator 110 by way of the second line 102 by the throttle 105 according to its maximum Kv value. Also at the time when the shut-off device 104 is switched between operating states 1 and 2, the first flow cross section of the expansion valve 103 is reduced, until a throughflow quantity or a Kv value of 0.2 $m^3/h$ (result of KV=1 $m^3/h$=maximum Kv value of the expansion valve 103−KV=0.8 $m^3/h$=maximum Kv value of the throttle 105) is set through the expansion valve 103. As shown by the overall Kv value shown in FIG. 2, the transition from operating state 1 to operating state 2 does not cause a sudden rise in the overall throughflow quantity.

Since at the time of the switch between operating state 1 and operating state 2 the expansion valve 103 is also operated with a Kv value of 0.2 $m^3/h$, the expansion valve 103 has a buffer region at around 0.2 $m^3/h$, to prevent permanent activation and deactivation of the shut-off device 104 and the second line 102. For example, as the requirement for the throughflow quantity of refrigerant drops, the Kv value of the expansion valve 103 can be reduced from 0.2 $m^3/h$ down to 0.0 $m^3/h$, until the shut-off device 104 is once again moved to the closed position. In other words the overall Kv value can be kept constant and permanent activation and deactivation of the shut-off device 104 can be prevented, even if the requirement fluctuates between 0.8 $m^3/h$ and 1 $m^3/h$.

In operating state 2 the refrigerant requirement rises, so the expansion valve 103 is set up to a maximum value of KV=1 $m^3/h$. In operating state 3 the refrigerant requirement drops again so the Kv value of the expansion valve 103 is reduced, until KV=0.2 m³/h is reached. During the transition between operating state 3 and operating state 4 the shut-off device 104 is moved again to the closed position, so that the Kv value of the throttle 105 drops from 0.8 m³/h to 0 m³/h. The Kv value of the expansion valve 103 is increased accordingly from Kv=0.2 m³/h to Kv=1 m³/h. As shown in FIG. 2, the overall Kv value remains constant during the transition between operating state 3 and operating state 4.

If the refrigerant requirement drops again, the Kv value of the expansion valve 103 is reduced continuously down to for example KV=0 m³/h.

Figure 3:
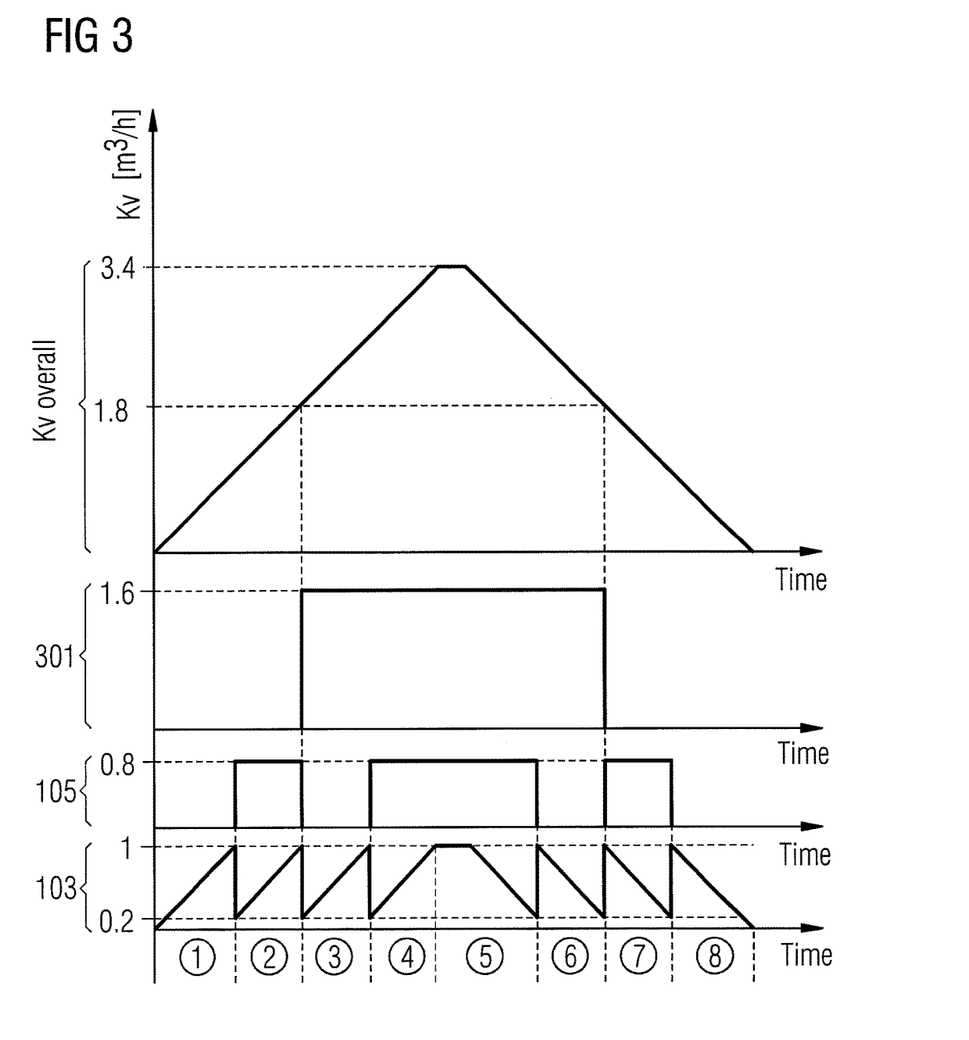
FIG. 3 shows a diagram illustrating a method for controlling a system with a second line connected in a parallel manner and a further second line connected in a parallel manner according to an exemplary embodiment.

FIG. 3 shows a further diagram illustrating a method for controlling a system with a second line 102 connected in a parallel manner and a further second line connected in a parallel manner according to a further exemplary embodiment. The embodiments of the second line and the further second lines themselves may be substantially the same. In FIG. 3, for greater clarity, the same maximum Kv values are used for the expansion valve 103 and the throttle 105. Depending on the design of the system and the individual valves, other (maximum) Kv values can be predefined and used.

The operating states 1 and 2 correspond to the same operating states as shown in FIG. 2 and described above.

During the transition between operating state 2 and operating state 3 a further second throttle 301 is activated. The shut-off device 104 is deactivated at the same time, so that the Kv value of the throttle 105 and in the second line 102 drops to 0 m³/h. The expansion valve 103 reduces its Kv value to 0.2 m³/h. The overall Kv value or overall mass flow present at the evaporator 110 at the fluid inlet 106 is therefore 1.8 m³/h (resulting from 0.2 m³/h (Kv value of the expansion valve 103)+1.6 m³/h (Kv value of the further throttle 301)).

The system, the control method for which is shown in the diagram in FIG. 3, has the second line 102 and a further second line. In each of the second lines 102 an additional throughflow quantity of refrigerant can be added discretely according to the maximum Kv value of the corresponding throttle 105 by way of a corresponding shut-off device 104. At the same time, with every activation and deactivation of a corresponding shut-off device 104, a buffer region of the expansion valve 103 of for example Kv value=0.2 m³/h is maintained. This prevents permanent switching between the operating states, if the requirement for the throughflow quantity of refrigerant is in a boundary region of the switching points.

To provide a buffer region in the exemplary embodiment shown in the diagram in FIG. 3, the further throttle can have a maximal Kv value, said Kv value being smaller than the sum of the maximum Kv value of the expansion valve 103 and the maximum Kv value of the throttle 105. The throttle 105 in the first line 101 must also have a smaller Kv value than the expansion valve 103 in the first line 101.

In operating state 3 the Kv value of the expansion valve 103 is increased again up to 1 m³/h. If the requirement for refrigerant at the fluid inlet 106 of the evaporator 110 continues to rise, during the transition from operating state 3 to operating state 4 the throttle 105 of the second line 102 is activated by the shut-off device 104 and the Kv value of the expansion valve 103 is reduced to 0.2 m³/h. If the requirement for refrigerant at the evaporator 110 continues to rise, the Kv value of the expansion valve 103 is increased further up to its maximum value of 1 m³/h. Operating state 5 shows the maximum throughflow quantity of the system shown in FIG. 3. As shown by the rise in the overall Kv value, a constant rise from 0 m³/h to maximum Kv value=3.4 m³/h can be implemented.

Operating states 5 to 8 show the reduction of the overall Kv value from 3.4 m³/h to 0 m³/h. Between operating states 5 and 6 the throttle 105 is deactivated. Between operating states 6 and 7 the throttle 105 is reactivated and the further throttle 301 is deactivated. Between operating states 7 and 8 the throttle 105 is deactivated and in operating state 8 the Kv value of the expansion valve 103 is finally reduced to 0 m³/h.

Figure 4:
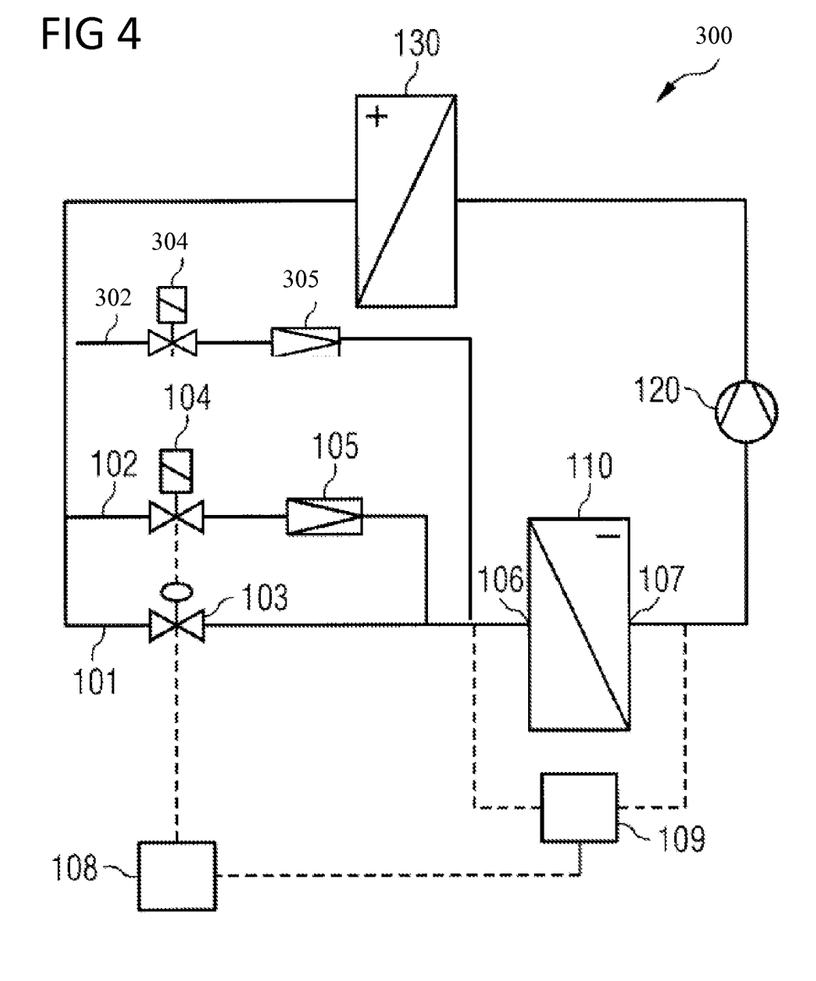
FIG. 4 shows a schematic diagram of an embodiment.

FIG. 4 shows a refrigeration unit 300, in which reference numerals identical to FIG. 1 are not repeated herein. The refrigeration unit 300 includes a third line 302, which is connected parallel to the first line 101 and the second line 102, and is connected to the fluid inlet 106 of the evaporator 110. Disposed in the third line 302 are a shut-off device 304 and a throttle 305 with a constant third flow cross section. The shut-off device 304 can be controlled in such a manner that when the shut-off device 304 is in the open position, a third mass flow of the fluid flows through the third line 302 and when the shut-off device 304 is in the closed position, no fluid flows through the second line 302 or a fluid flow through the second line 302 is prevented.

It should also be noted that "comprising" does not exclude any other elements or steps and "a" or "an" does not exclude a plurality. It should also be noted that features or steps that have been described with reference to one of the above exemplary embodiments can also be used in combination with other features or steps of other exemplary embodiments described above.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A system for supplying a fluid to an evaporator of a refrigeration device, the system comprising:
   a first line connected to a fluid inlet of the evaporator;
   a second line connected to the fluid inlet of the evaporator;
   an expansion valve with a continuously variable first flow cross section, wherein the expansion valve is positioned in the first line in such a manner that the continuously variable first flow cross section sets a first mass flow of the fluid through the first line;
   a shut-off device positioned in the second line, the shut-off device being discretely switchable between an open position and a closed position such that a second mass flow of the fluid is conveyed through the second line when the shut-off device is in the open position and a fluid flow through the second line is prevented when the shut-off device is in the closed position;
   a throttle with a constant second flow cross section, the throttle being positioned in the second line in such a manner that the second mass flow is conveyed through the second flow cross section when the shut-off device is in the open position; and
   a control unit to control the expansion valve and set the continuously variable first flow cross section, and to control the shut-off device as a function of the continuously variable first flow cross section defined by the expansion valve, to thereby control a total mass flow including the first mass flow through the first line and a second mass flow through the second line, wherein controlling the total mass flow includes:
increasing the total mass flow above a threshold mass flow by:
switching the shut-off device from the closed position to the open position, to thereby allow the second mass flow of the fluid through the second line, and
controlling the expansion valve to reduce the first mass flow of the fluid through the first line.

2. The system as claimed in claim 1, wherein the expansion valve measures the continuously variable first flow cross section and transfers information about the first flow cross section to the control unit.

3. The system as claimed in claim 2, wherein the expansion valve measures the continuously variable first flow cross section using an induction measurement.

4. The system as claimed in claim 1, wherein:
the system further comprises a sensor coupled to the fluid inlet and/or a fluid outlet of the evaporator to measure a state parameter of the fluid at the fluid inlet and/or at the fluid outlet, the sensor transferring information regarding the state parameter to the control unit, and
the control unit is configured to:
receive the information regarding the state parameter from the sensor;
based on the information regarding the state parameter, determine to increase the total mass flow above the threshold mass flow.

5. The system as claimed in claim 1, wherein the shut-off device has a solenoid valve.

6. The system as claimed in claim 1, wherein the expansion valve is an electromechanically configured valve.

7. The system as claimed in claim 1, wherein the expansion valve is a piezo valve.

8. The system as claimed in claim 1, further comprising: a third line connected to the fluid inlet of the evaporator; a third-line shut-off device positioned in the third line, the third-line shut-off device being discretely switchable between an open position and a closed position such that a third mass flow of the fluid is conveyed through the third line when the third-line shut-off device is in the open position and a fluid flow through the third line is prevented when the third-line shut-off device is in the closed position; and a third-line throttle with a constant third flow cross section, the third-line throttle being positioned in the third line in such a manner that the third mass flow is conveyed through the third flow cross section when the third-line shut-off device is in the open position, wherein the control unit controls the third-line shut-off device as a function of the continuously variable first flow cross section and the second flow cross section.

9. The system as claimed in claim 3, wherein
the system further comprises a sensor coupled to the fluid inlet and/or a fluid outlet of the evaporator to measure a state parameter of the fluid at the fluid inlet and/or at the fluid outlet, the sensor transferring information regarding the state parameter to the control unit, and
the control unit is configured to:
receive the information regarding the state parameter from the sensor;
based on the information regarding the state parameter, determine to increase the total mass flow above the threshold mass flow.

10. The system as claimed in claim 9, wherein the shut-off device has a solenoid valve.

11. The system as claimed in claim 10, wherein the expansion valve has a piezo actuator.

12. The system as claimed in claim 11, further comprising: a third line connected to the fluid inlet of the evaporator; a third-line shut-off device positioned in the third line, the third-line shut-off device being discretely switchable between an open position and a closed position such that a third mass flow of the fluid is conveyed through the third line when the third-line shut-off device is in the open position and a fluid flow through the third line is prevented when the third-line shut-off device is in the closed position; and a third-line throttle with a constant third flow cross section, the third-line throttle being positioned in the third line in such a manner that the third mass flow is conveyed through the third flow cross section when the third-line shut-off device is in the open position, wherein the control unit controls the third-line shut-off device as a function of the continuously variable first flow cross section and the second flow cross section.

13. The system of claim 1, wherein the expansion valve has a possible throughput first Kv value and the throttle has a possible throughput second Kv value, the first Kv value being greater than the second Kv value.

14. The system of claim 1, wherein the control unit is configured to increase the total mass flow above a threshold mass flow by:
switching the shut-off device from the closed position to the open position, to thereby allow the second mass flow of the fluid through the second line, and
controlling expansion valve to reduce the first mass flow of the fluid through the first line by an amount such that the total mass flow remains constant during the switching of the shut-off device from the closed position to the open position.

15. The system of claim 1, wherein to increase the total mass flow above the threshold mass flow, the control unit switches the shut-off device from closed to open and controls the expansion valve to reduce the first mass flow at the same time or with a delay of approximately 0.01-1.5 sec.

16. The system of claim 1, wherein the threshold mass flow is a maximum of the first mass flow defined by the continuously variable first flow cross section of the expansion valve.

17. The system of claim 1, wherein the control unit is configured to decrease the total mass flow below the threshold mass flow by:
switching the shut-off device from the open position to the closed position, to thereby stop the second mass flow of the fluid through the second line, and
control the expansion valve to increase the first mass flow of the fluid through the first line.

18. A method for supplying a fluid to an evaporator of a refrigeration unit, the method comprising:
controlling a first mass flow of the fluid in a first line, which is connected to a fluid inlet of the evaporator, by continuously varying a first flow cross section of an expansion valve positioned in the first line; and
controlling a shut-off device, which is positioned in a second line connected to the fluid inlet of the evaporator, such that when the shut-off device is in a closed position, a fluid flow through the second line is prevented and when the shut-off device is in an open position, a second mass flow of the fluid flows through the second line and through a throttle positioned in the second line, the throttle having a constant second flow cross section, and
wherein the shut-off device is controlled as a function of the first flow cross section of the expansion valve, to thereby control a total mass flow including the first mass flow through the first line and a second mass flow through the second line, wherein controlling the total mass flow includes increasing the total mass flow above a threshold mass flow by:
switching the shut-off device from the closed position to the open position, to thereby allow the second mass flow of the fluid through the second line, and
controlling the expansion valve to reduce the first mass flow of the fluid through the first line.

19. The method as claimed in claim 18, wherein the expansion valve has a possible throughput first Kv value and the throttle has a possible throughput second Kv value, the first Kv value being greater than the second Kv value.

20. The method as claimed in claim 18, wherein
the shut-off device is moved to the open position, when the first flow cross section of the expansion valve exceeds a first cross section size, and
the shut-off device is moved to the closed position, when the first flow cross section of the expansion valve drops below a second cross section size.

21. The method as claimed in claim 19, wherein
the shut-off device is moved to the open position, when the first flow cross section of the expansion valve exceeds a first cross section size, and
the shut-off device is moved to the closed position, when the first flow cross section of the expansion valve drops below a second cross section size.

22. A system for supplying a fluid to an evaporator of a refrigeration device, the system comprising:
a first line connected to a fluid inlet of the evaporator;
a second line connected to the fluid inlet of the evaporator;
an expansion valve with a continuously variable first flow cross section, wherein the expansion valve is positioned in the first line in such a manner that the continuously variable first flow cross section sets a first mass flow of the fluid through the first line;
a shut-off device positioned in the second line, the shut-off device being discretely switchable between an open position and a closed position such that a second mass flow of the fluid is conveyed through the second line when the shut-off device is in the open position and a fluid flow through the second line is prevented when the shut-off device is in the closed position;
a throttle with a constant second flow cross section, the throttle being positioned in the second line in such a manner that the second mass flow is conveyed through the second flow cross section when the shut-off device is in the open position; and
a control unit to control the expansion valve and set the continuously variable first flow cross section, wherein the expansion valve measures the continuously variable first flow cross section using an induction measurement and transfers information about the continuously variable first flow cross section to the control unit and the control unit controls the shut-off device as a function of the information about the continuously variable first flow cross section that the expansion valve has transferred to the control unit, to thereby control a total mass flow including the first mass flow through the first line and a second mass flow through the second line, wherein controlling the total mass flow includes:
increasing the total mass flow above a threshold mass flow by:
switching the shut-off device from the closed position to the open position, to thereby allow the second mass flow of the fluid through the second line, and
controlling the expansion valve to reduce the first mass flow of the fluid through the first line.

23. A system for supplying a fluid to an evaporator of a refrigeration device, the system comprising:
a first line connected to a fluid inlet of the evaporator;
a second line connected to the fluid inlet of the evaporator;
an expansion valve with a continuously variable first flow cross section, wherein the expansion valve is positioned in the first line in such a manner that the continuously variable first flow cross section sets a first mass flow of the fluid through the first line;
a shut-off device positioned in the second line, the shut-off device being discretely switchable between an open position and a closed position such that a second mass flow of the fluid is conveyed through the second line when the shut-off device is in the open position and a fluid flow through the second line is prevented when the shut-off device is in the closed position;
a throttle with a constant second flow cross section, the throttle being positioned in the second line in such a manner that the second mass flow is conveyed through the second flow cross section when the shut-off device is in the open position; and
a control unit to control the expansion valve and set the continuously variable first flow cross section, wherein the expansion valve measures the continuously variable first flow cross section and transfers information about the continuously variable first flow cross section to the control unit and the control unit controls the shut-off device as a function of the information about the continuously variable first flow cross section that the expansion valve has transferred to the control unit, to thereby control a total mass flow including the first mass flow through the first line and a second mass flow through the second line, wherein controlling the total mass flow includes:
increasing the total mass flow above a threshold mass flow by:
switching the shut-off device from the closed position to the open position, to thereby allow the second mass flow of the fluid through the second line, and
controlling the expansion valve to reduce the first mass flow of the fluid through the first line.

* * * * *

UNITED STATES PATENT AND TRADEMARK OFFICE
CERTIFICATE OF CORRECTION

PATENT NO. : 9,618,247 B2  
APPLICATION NO. : 13/668946  
DATED : April 11, 2017  
INVENTOR(S) : Jekimow et al.

Page 1 of 1

It is certified that error appears in the above-identified patent and that said Letters Patent is hereby corrected as shown below:

On the Title Page

Add:

(30) Foreign Application Priority Data:

November 3, 2011.................................. EP 11187670

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*